June 6, 1961

N. VON KOTSCHUBEY 2,987,365

APPARATUS AND METHOD OF REGISTERING THE INDICATION OF A COUNTING MECHANISM

Filed April 19, 1956

INVENTOR.
NICKOLAUS VON KOTSCHUBEY
BY
Morgan, Finnegan, Durham & Pine

United States Patent Office 2,987,365
Patented June 6, 1961

2,987,365
APPARATUS AND METHOD OF REGISTERING THE INDICATION OF A COUNTING MECHANISM
Nikolaus von Kotschubey, Zug, Switzerland, assignor to Landis & Gyr, A.G., Zug, Switzerland, a body corporate of Switzerland
Filed Apr. 19, 1956, Ser. No. 579,337
Claims priority, application Switzerland Feb. 11, 1956
4 Claims. (Cl. 346—14)

The present invention relates to counting mechanisms such as electric meters or the like and especially to apparatus and method for registering the indications of such counting mechanisms. The reading of counter mechanisms, especially of meters located in numerous private households, occasions very considerable costs to the electric companies and others. Moreover, when reading the meters mistakes may often be made, namely by the reader in transferring the meter indication from the meter to the instrument reading book and also from the reading instrument book to the evaluation points where the readings are to be further elaborated, e.g. booked and invoiced.

It is the object of the present invention to overcome the possibility of error in making such readings and to reduce the cost of recording meter values in the homes of subscribers.

The invention concerns a process for the registration of counter mechanisms with figures arranged on at least one figure carrier. The invention concerns an arrangement for practicing this process and for an application of it. Generally speaking, the invention comprises apparatus in which a foil having a surface visibly changeable on the passing of an electric current is brought into contact with the electrically conductive symbols to be registered and in passing an electric current from the symbol to the foil or in the opposite direction whereby the foil is changed at the point of the symbols to be registered and the indication registered thereby on said foil.

The arrangement of the invention is distinguished by a contact being arranged opposite the symbol carrier in order to bring a foil having a visibly changeable surface when an electric current passes through it, into contact with the electrically conductive symbols that are to be registered, and by the symbols and the foil being connected with a source of electricity.

It wil be understood that the foregoing general description and the following detailed description as well are exemplary and explanatory of the invention but are not restrictive thereof.

Figure 1:
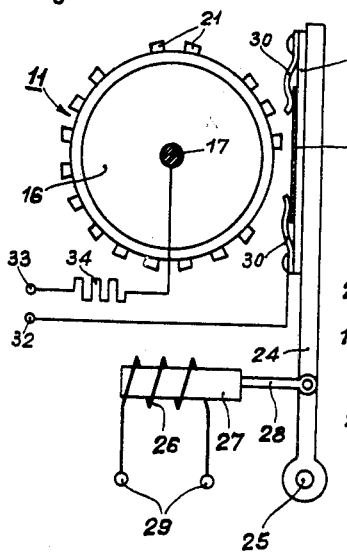
Figure 2:
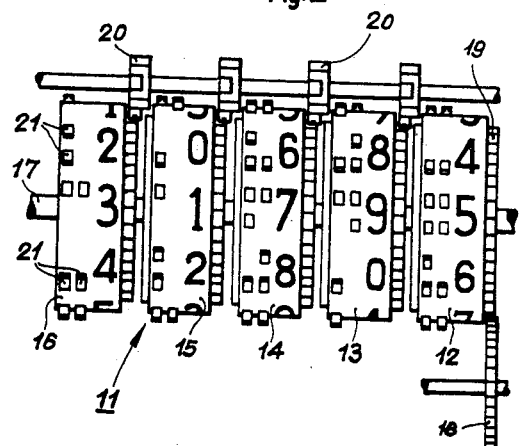
Figure 3:
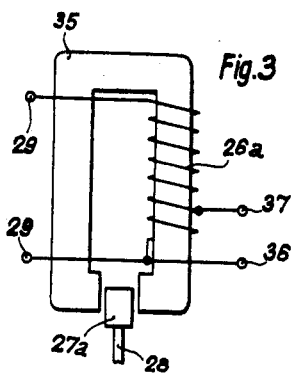
Figure 4:
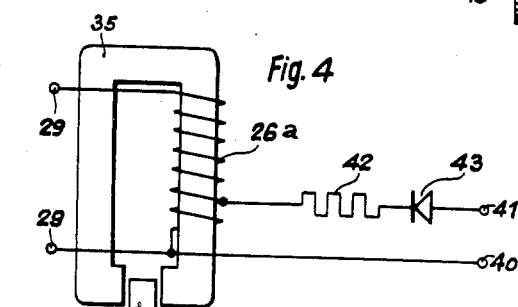
Figure 5:
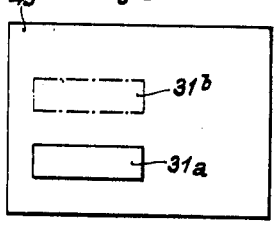
Figure 6:
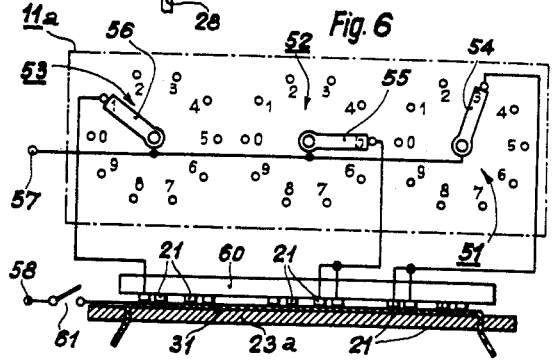

FIG. 1 shows a preferred form of the invention;
FIG. 2 shows a front elevation of the figure rolls with various symbols to be registered;
FIG. 3 shows a part of another embodiment with a magnet coil with taps, which coil is provided both for the excitation of the electromagnet serving to press the foil against the figures to be registered and, at the same time, for impressing voltage on said figures and the foil;
FIG. 4 is a view similar to that of FIG. 3 with an additional rectifier;
FIG. 5 shows a card intended for mailing having a smaller foil sensitive to current, suitable for registration;
FIG. 6 represents another embodiment of the invention adapted to a different form of counting device.

The arrangement shown in FIG. 1 shows a counter mechanism with several figure rolls or symbols 12, 13, 14, 15, 16 of which in FIGURE 1 only one, namely 16, is visible. According to FIG. 2 the figure rolls are arranged in the manner old in the art, that is, coaxially next to one another and are rotatable singly about a common axis 17. The mechanism represented is a five-figure decimal place counter mechanism and each of the figure rolls is provided with the figures 0, 1, 2 . . . 8, 9. The unit figure roll 12 is driven by a pair of gears 18, 19 whereas the remainder of the rolls 13 to 16 are moved on by means of decade gears.

The figure rolls 12 to 16 have at their circumference, besides the figures mentioned before, elevations or additional symbols 21 which are provided according to FIG. 2 with rectangular terminal surfaces but the elevations could just as well be cylindrical with circular terminal surfaces. According to any prefered code, one or several elevations or symbols 21 are assigned to the usual figures 0, 1, 2 . . . 8, 9 in a definite order, it being possible to arrange the elevations in each case at the corners of an imaginary rectangle. According to FIG. 2 a single elevation in the left upper corner of the imagined rectangle represents for example the figure 1; a single elevation in the left lower corner, the figure 0; two elevations at the left above and at the left below the fig. 2; two elevations at the left above and at the right above, the figure 3; two elevations at left below, the figure 4. Four elevations in all the four corners of the imaginary rectangle represent the figure 5; three elevations at the left above, at the left below and at the right below, the figure 6; three elevations at the left above and at the left below, the figure 7; three elevations at the right above, at the right and at the left below, the figure 8 and 3 elevations at the left above, at the right above and at the right below, the figure 9.

Of course, any other code could be selected for example, a code in which each figure is represented by only two elevations.

Opposite the figure rolls there is a contact plate 23 fastened to two swivel arms 24 and which can thus be swung about an axle 25. To actuate the contact plate 23 there is an electromagnet 26, 27, the armature 27 of which is in operative connection with one of the arms 24 by means of a guide 28. The magnetic coil 26 is provided with terminals 29. When the magnet 26, 27 is excited the plate 23 is swung against the registration to be registered of the figure rolls 12—16.

The contact plate 23 is provided with elastic clamps 30 by means of which a foil 31 on which the registration is to take place is detachably held. The foil 31, for example, a sheet of paper which on the side turned toward the figure rolls 12—16 is covered by a thin metal coating produced by evaporation. Such foils are known by the name of "metallized paper" and are used especially for the construction of electric condensers. It is also used as registering paper in writing oscillographs, where an electric current is passed from the pen to the metal coating or vice versa, a visible change of the metal coating takes place, the metal coating being burnt out at the points where the current passes from the pen to the foil or vice versa.

The clamps 30 are connected to an electric terminal 32 while another terminal 33 is connected conductively across a resistor 34 to the axle 17 of the figure rolls 12—16. The rolls 12—16 and their elevations 21 consists of metal and are consequently electric conductors.

To register the indication the terminals 32 and 33 are connected with a source of direct or alternating current. When the magnet 26, 27 is not energized the foil 31 is at a certain distance from the elevations 21 of the figure rolls and no current can flow through the foil. However if the terminals 29 of the electromagnet 26, 27 are temporarily connected to a suitable source of current the electromagnet will be energized and the foil 31 pressed by means of the contact plate 23 against the elevations 21 to be registered. In that case electric current flows from the terminal 33 by way of the resistor 34 to the figure rolls 12—16 and from the elevations of the latter to be registered on the metal coating of foil 31 and then to the terminal 32 or vice versa according to the polarity of the connected source of current. At the points where the current passes from the elevations 21 to the metal coating of the foil 31, or vice versa, the metal coating is burnt out whereby the indication of the counter mechanism 11 is registered on the foil. Immediately afterwards the electromagnet 26, 27 is de-energized through the interruption of the corresponding circuit, whereafter the contact plate 23 with the foil 31 is swung away from the figure rolls 12—16, for example by means of a retracting spring (not shown). The foil may later on be removed from the contact plate 23 and transported to an evaluation point and used there for additional purposes. The registration is shown by the burnt places corresponding to the elevations 21 and, if desired, may be removed by machine from the foil and transmitted to a hole punching machine. The reading by machine may be effected optically or electro-mechanically, and in the latter case may make use of the fact that at the points of registration the metal coating of the foil possesses a smaller electric conductivity or no electric conductivity at all.

If the figures 0, 1, 2 . . . 8, 9 are formed also in relief as in printing type, the figures may also be registered on the foil 31 in the manner stated. For purposes of mechanical evaluation of the registration it will however always be useful to have, in addition the registration in code.

The foil sensitive to the electric current need not be in all cases metallized paper, for other foils having surfaces which undergo visible chemical changes may also be used.

FIG. 3 is a variant of the registration arrangement in which the coil 26a of the electromagnet is built as an economizing transformer. Part of the coil winding is connected to terminals 36 and 37 which are connected to the terminals 32 and 33 as in FIG. 1. The core 35 of the economical transformer is constructed as a ring with an air gap into which the armature of the electromagnet is drawn when for the purpose of energizing the magnet the terminals 29 are connected to a suitable source of voltage, e.g. the light current distributing network. In that case there appears simultaneously at the terminals 36 and 37 and thus at the figure rolls 12—16 and the foil 31 a lower voltage which serves for the registration of the symbol 21 which come in contact with the foil. In this case registration takes place by alternating current.

FIG. 4 shows another variant in which part of the magnet coil winding 26a is directly connected across a resistor 42 and a rectifier 43 to a terminal 41. The terminals 40 and 41 are connected again to the terminals 32 and 33, FIG. 1. When the electromagnet is energized a continuous voltage reaches the figure rolls 12—16 and the foil, the registration taking place by means of direct current when the foil touches the figure rolls.

In the place of a magnet also another electromechanical transformer, e.g. an electromotor, could be used for the purpose of actuating the contact plate 23.

For holding the foil 31 against the contact plate 23 the clamps 30 may be replaced by other means that permit the application of the foil without making it necessary to remove the contact plate. Thus the plate may be provided with slits through which the foils can be passed.

However it is also possible to paste, or fasten otherwise, a piece of foil on a more solid support 45 e.g. one of cardboard, as shown in FIG. 5. In this case the support 45 is fixed to the contact plate in such a way that the piece of foil 31a is placed opposite the indication of the counter mechanism to be registered, a contact piece (not shown) insuring that the metallic coating of the foil is connected to the terminal 32. The card 45 together with the piece of foil 31a can be advantageously arranged to be sent by mail so that the registration may be sent off promptly and mailed from the location of the meter to the evaluation point. In order to register the indication of duplex counters, as for example in electric meters with a high and low tariff, the card 45 may be provided with a second piece of foil 31b or it may consist of a single piece of foil of a corresponding size.

The method of registration described may be preferably used for the reading of electric meters located in private households. The registering arrangement then forms an integrating part of an electricity counter. The counter mechanism 11 may be directly that of the electric meter. The actuation of the contact plate 23 may be under the remote control of a central station, for example, by means of an audio-frequency control impulse which is transmitted over the current distribution network and which temporarily connects by means of a receiver of known construction which is present in the counter in question, the terminals 29 of the electromagnet 26, 27 with the network. In this manner the indications of all the meters connected to the network the receiving instruments of which respond to the same pilot frequency can be registered simultaneously at any point of time selected by the electric company.

It is also possible to introduce into the counter a time element e.g. a time-switch, which in predetermined intervals of, for example, one or two months, connects the coil 26 of the electromagnet 26, 27 temporarily by impulse to the network so that the registration takes place. Such a time switch may contain for its actuation a spring mechanism or a synchronous electric motor controlled by the main frequency.

In the place of the magnetic coil 26a of the electromagnet the potential coil of the counter may be constructed in a manner analogous to an economical transformer in FIG. 3 or 4, in that a part of the coil winding serves as a source of current for impressing potential on the figure rolls 12—16 and the foil 31. A separate electromagnet is in that case provided for the actuation of the contact device. It is possible to use, as the core of the electromagnet, the iron of the potential coil of the counter.

The potential coil of the counter can at the same time be the magnet coil of the electromagnet for actuating the contact device. For example, by means of a series resistor the current is limited to such an extent that while the counter is working properly, the armature of the electromagnet is not attracted. If the registration is to take place the series resistor for example is shunted temporarily by means of an audiofrequency control impulse by way of the network while a current impulse which is larger than the previous one flows through the winding and the armature is attracted briefly. The winding acting as a magnet coil and as a potential coil of the counter may in addition be provided with a tap and thus operate as an economizing transformer according to FIG. 3 or FIG. 4.

In applying the registration process to electric meters the foil may either be kept under lock and key and accessible only to the working force for the purpose of exchanging the foil against a fresh one, or a slit may be arranged in the housing of the counter which is accessible to everybody, through which the foil 31 or a card 45 with the foil 31a arranged on it may be pushed in or taken out, so that the customers themselves can change the foils. This is an advantage where the foils are arranged to be sent by mail as in that case no employees of the company are needed to insert the foils. The opening in the housing of the counter making the change of the foils possible can be constructed appropriately so that the mode of operation of the figure rolls can not be influenced through said opening.

The registering arrangement may also be constructed as an auxiliary instrument of the electric counter, in which case the figure rolls 12—16 of the registering arrangement are actuated from the counter by pulse control.

What was said with reference to counters with builtin registration arrangement also refers to the registration arrangement serving as an auxiliary appliance. In both cases it may be expedient always to register on the foil 31 not only the instantaneous value of the counter mechanism 11, but also at the same time another mark which remains always the same, for example, the number of the customer or the number of the counter, so that later on it may be possible to identify with certainty at any time the various foils bearing registrations.

The figure rollers 12—16 of the counter mechanism 11 need not be of metal in every case, they may also be made of insulating material and need exhibit only a metal ring with the symbols 21 in relief. The symbols 21 might also be printed with electrically conductive pigment and the like on insulated rolls in which case it would indeed be necessary to provide by suitable means for an electric connection of the symbols to be registered and an appropriate source of current. It is furthermore possible to imbed the metallic signs 21, which are in relief form, in an insulating substance so that the rolls become cylindrical on the outside and so that the outer surfaces of the symbols 21 are flush with the outer surface of the insulating material.

The symbols 21 may have any desired geometrical form and may also form ribs of a rectilinear or curved shape.

The contact plate 23 described and shown could be replaced by another contact arrangement of a suitable construction.

In the embodiment according to FIG. 6 the counter mechanism 11a contains several electric step-by-step switches 51, 52 and 53 with each of which a decimal place of the figures to be indicated by the counter mechanism is associated and each showing 10 stationary contact elements 0, 1, 2 . . . 8, 9 which cooperate with wipers 54, 55 and 56 respectively. While the wiper 54 proceeds step-by-step from one to the next stationary contact element 0—9, the other two wipers 55 and 56 are stationary. The wiper 55 moves from one contact element to the following stationary contact element only when the wiper 55 migrates from the contact element 9 to the contact element 0. The motional drive of the wipers 55 and 56 is effected in a manner similar to that of the figure rolls 12—16 by means of decade drives. All the wipers are connected to each other by electric current and to a connecting terminal 57.

On an insulating plate 60 which serves as a figure carrier there are arranged for every decimal place of the figures to be indicated by the counter 11a, electrically conductive symbols 21 in relief, which correspond for example to those according to FIGS. 1 and 2. The arrangement of these symbols on plate 60 may be in any arbitrary arrangement for example, so that those serving to represent the figures 0—9 of a decimal place are arranged in two columns each of 5 lines. Each of the stationary contact elements of the step-by-step switches 51—53 is electrically connected to one or several of the figures 21 according to the code selected for the representation of figures 0—9 of each decimal place of the indication of the counter mechanism. To insure distinctiveness, only those electric connections are shown in FIG. 6 that lead to the contact elements connected to the wipers 54—56.

By means of a plate-shaped contact device 23a, a foil 31 is pressed against all the signs 21 of the insulating place 60. The contact device is influenced by springs (not shown), which act so as to press the contact device 23a steadily against the symbols 21. The foil is inserted into slits of the contact plate 23a. In the manner not detailed the metallic coating of the foil 31 is connected by means of a switch 61 to a connecting terminal 58. For the exchange of the foil 31 the contact device 23a can be moved away from the symbols 21 in opposition to the influence of the coordinated springs. The terminals 57 and 58 are connected to a source of current not shown in FIG. 6.

If the indication of the counter mechanism 11a on the foil 31 is to be registered the switch 61 need only be closed temporarily, whereafter in the passage of current from the symbols 21 to the foil 31 or vice versa, the metallic coating of the foil is burnt out at the points in question, as has previously been explained with reference to the first embodiment. The actuation of the switch 61 can be effected by means of an associated electromagnet (not shown) by remote control. However there may also be present a time element e.g. a clock with spring mechanism or electric synchronous motor for the purpose of closing and opening again the switch 61 automatically at regular intervals of time. Between the registrations succeeding each other the foil 31 must, of course, be exchanged for one that has not yet been used.

The registration arrangement of FIG. 6 described last, may also be an integrating part of an electric meter or another counter. This registrating device can also be constructed as an auxiliary appliance for such a counter, in which case the counter mechanism 11a is driven by impulse control or direct mechanical coupling from the counter mechanism of the counter in question.

In any case the counter mechanism may be closed so as to be absolutely inaccessible to the customer, whereas access to the foil 31 and the contact device 23a may be free, as the proper operation of the counter 11a can not be influenced at the symbol 21.

The invention in its broader aspects is not limited to the specific mechanisms shown and described but departures may be made therefrom within the scope of the accompanying claims without departing from the principles of the invention and without sacrificing its chief advantages.

What is claimed is:

1. Apparatus for permanently recording meter indications comprising a plurality of rotatable indicators each carrying on a common periphery a plurality of said meter indications, electrically conductive marking elements fixed on each of said rotatable indicators said markings being arranged in a plurality of fields, each of said fields being allocated to a respective of said meter indications and having a unique positional arrangement of said marking elements, certain of said fields including at least two of said markings, a movable record holder, a record including a recording surface, the appearance of said surface changing when subjected to an electrical current, said record being removably clamped to said record holder and said recording surface being oriented adjacent said electrically conductive elements, a source of electrical current, a pair of electrical connections connected respectively to said recording surface and to said electrically conductive elements, said connections including terminals energized by said source of electrical current, electromagnetic means including an armature and a winding, said winding being periodically energized by said source of current, a coupling between said armature and said record holder for actuating said record holder when said winding is energized to bring said recording surface into momentary contact with said conductive elements whereby momentary current flows through said circuit including said recording surface to thereby record said meter indications.

2. Apparatus according to claim 1 in which said rotatable indicators comprise a plurality of coupled counting wheels, said recording surface comprises a metallic foil and said record holder comprises a pivoted plate connected at an intermediate point to the armature of said electromagnetic means.

3. Apparatus for permanently recording meter indications comprising a plurality of data carrying members each carrying indicia forming a part of said meter indications, a plurality of groups of electrically conductive elements each group comprising an encoded form of the respective indicium of said indicia carried by said data carrying members, certain of said groups having at least two of said conductive elements, a movable record holder disposed adjacent said members, a record including a recording surface the appearance of which changes when subjected to an electrical current, said record being movably mounted on said movable record holder, said recording surface being adjacent said electrically conductive elements, a source of electrical current, electromagnetic means including an armature and a winding periodically energized by said source of current, a coupling between said armature and said record holder for actuating said record holder to bring said recording surface into momentary contact with said conductive elements, and a circuit energized by said energizing current flowing in said armature winding and including connections to said conductive elements and said recording surface whereby said recording surface is subjected to a momentary current to thereby record the encoded form of said meter indications.

4. Apparatus according to claim 3 in which said data carrying members comprise counting wheels of an integrating consumption meter and said recording surface comprises a metallic foil.

References Cited in the file of this patent

UNITED STATES PATENTS

| | | |
|---|---|---|
| 1,825,551 | Serrell | Sept. 29, 1931 |
| 1,865,610 | Blair | July 5, 1932 |
| 2,135,944 | Miles | Nov. 8, 1938 |
| 2,539,835 | Heynisch | Jan. 30, 1951 |
| 2,554,323 | Cade | May 22, 1951 |
| 2,715,360 | Brown | Aug. 16, 1955 |
| 2,757,063 | Pagnard | July 31, 1956 |

FOREIGN PATENTS

| | | |
|---|---|---|
| 538,016 | Great Britain | July 17, 1941 |